US012081137B2

(12) United States Patent
Hashimoto et al.

(10) Patent No.: US 12,081,137 B2
(45) Date of Patent: Sep. 3, 2024

(54) POWER CONVERTER

(71) Applicant: DENSO CORPORATION, Kariya (JP)

(72) Inventors: Yuuya Hashimoto, Kariya (JP); Yuu Yamahira, Kariya (JP); Toshiyuki Kouno, Kariya (JP); Hiromi Ichijyo, Kariya (JP); Kazuya Takeuchi, Kariya (JP); Tatsuya Murakami, Kariya (JP); Tetsuya Matsuoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 160 days.

(21) Appl. No.: 17/954,593

(22) Filed: Sep. 28, 2022

(65) Prior Publication Data

US 2023/0020456 A1 Jan. 19, 2023

Related U.S. Application Data

(63) Continuation of application No. PCT/JP2021/007125, filed on Feb. 25, 2021.

(30) Foreign Application Priority Data

Mar. 31, 2020 (JP) ................................ 2020-062637

(51) Int. Cl.
*H02M 7/00* (2006.01)
*H02M 7/5387* (2007.01)
*H02P 27/08* (2006.01)

(52) U.S. Cl.
CPC ....... *H02M 7/003* (2013.01); *H02M 7/53871* (2013.01); *H02P 27/08* (2013.01)

(58) Field of Classification Search
CPC ...... H02M 3/156; H02M 7/003; H02M 7/797; H02M 1/00; H02M 7/48; H02P 27/06;
(Continued)

(56) References Cited

U.S. PATENT DOCUMENTS

2018/0350515 A1* 12/2018 Okamoto .............. H01F 27/402
2019/0234996 A1 8/2019 Nomura et al.
(Continued)

FOREIGN PATENT DOCUMENTS

JP 2012-191768 A 10/2012
JP 2015-23619 A 2/2015
(Continued)

OTHER PUBLICATIONS

U.S. Appl. No. 17/954,693, filed Sep. 28, 2022 in the name of Yamahira et al.
(Continued)

*Primary Examiner* — Said Bouziane
(74) *Attorney, Agent, or Firm* — Oliff PLC (57) ABSTRACT

A power converter includes an inverter, a converter, an electrical-machine busbar, an electrical-machine sensor, an electrical-machine-sensor housing, a converter, a converter busbar, a converter-sensor housing. The inverter supplies a three-phase alternating current to a rotating electrical machine. The converter converts a voltage between a direct current power supply and the inverter. The electrical-machine busbar passes a current between the inverter and the rotating electrical machine. The electrical-machine sensor detects the current flowing through the electrical-machine busbar based on a magnetic field. The electrical-machine-sensor housing accommodates the electrical-machine sensor and the electrical-machine busbar together. The converter sensor detects the current flowing through the converter based on a magnetic field. The converter-sensor housing is disposed apart from the electrical-machine-sensor housing, and accommodates the converter sensor and the converter busbar together.

9 Claims, 4 Drawing Sheets

(58) Field of Classification Search
CPC ...... H02J 7/143; H02J 7/1423; G01R 15/207; G01R 19/0092; H01L 23/04; H01L 23/053; H01L 23/552; H01L 23/367; H01R 9/223
See application file for complete search history.

(56) References Cited

U.S. PATENT DOCUMENTS

| | | |
|---|---|---|
| 2019/0269031 A1 | 8/2019 | Ishibashi et al. |
| 2020/0025803 A1 | 1/2020 | Esaka et al. |

FOREIGN PATENT DOCUMENTS

| | | | | |
|---|---|---|---|---|
| JP | 2015-186317 A | 10/2015 | | |
| JP | 2016-039734 A | 3/2016 | | |
| JP | 2021-162416 A | 10/2021 | | |
| JP | 2021-164241 A | 10/2021 | | |
| JP | 2021-164242 A | 10/2021 | | |
| JP | 2021-164243 A | 10/2021 | | |
| WO | WO-2013065849 A1 * | 5/2013 | ............ | H02M 7/003 |
| WO | 2021/199803 A1 | 10/2021 | | |
| WO | 2021/199804 A1 | 10/2021 | | |

OTHER PUBLICATIONS

U.S. Appl. No. 17/941,705, filed Sep. 9, 2022 in the name of Ichijyo, Hiromi.

* cited by examiner

POWER CONVERTER

CROSS REFERENCE TO RELATED APPLICATIONS

The present application is a continuation application of International Patent Application No. PCT/JP2021/007125 filed on Feb. 25, 2021, which designated the U.S. and claims the benefit of priority from Japanese Patent Application No. 2020-062637 filed on Mar. 31, 2020. The entire disclosures of all of the above applications are incorporated herein by reference.

TECHNICAL FIELD

The present disclosure relates to a power converter.

BACKGROUND

A power converter may be adopted in a vehicle. The power converter may convert a direct current voltage from a direct current power supply to a three-phase alternating current to supply the three-phase alternating current to a motor. The power converter may include a converter to boost the direct current voltage from the direct current power supply and an inverter to convert the direct current voltage to the three-phase alternating current.

SUMMARY

The present disclosure describes a power converter including an electrical-machine-sensor housing and a converter-sensor housing.

BRIEF DESCRIPTION OF DRAWINGS

Objects, features and advantages of the present disclosure will become more apparent from the following detailed description made with reference to the accompanying drawings. In the drawings.

DETAILED DESCRIPTION

A power converter may include a current sensor used for detecting phase currents supplied to the motor from the inverter and detecting a current flowing through a converter. The current sensor is provided with a terminal unit made of resin that includes multiple busbars for passing the current as a detected target and multiple sensor elements adopted to corresponding busbars. The terminal unit in the power converter may function as a housing for accommodating all of the busbars and sensor elements together.

However, a member generating a large amount of heat such as a reactor may be included in the converter. Therefore, the temperature of a converter busbar for passing a current as a detected target flowing through the converter is likely to rise than other busbars due to the connection with the member included in the converter generating a large amount of heat. A single housing integrally holds the busbar, the sensor element and such a converter busbar. With the heat transfer through the housing, the temperature of an electrical-machine sensor for detecting a current flowing to a rotating electrical machine may excessively rise along with a rise in the temperature of the converter busbar. The precision of detecting the current flowing to the rotating electrical machine may decrease due to an excessive increase in the temperature of the electrical-machine sensor.

According to an aspect of the present disclosure, a power converter includes an inverter, a converter, an electrical-machine busbar, an electrical-machine sensor, an electric-machine-sensor housing, a converter busbar, a converter sensor, and a converter-sensor housing. The inverter supplies a three-phase alternating current to a rotating electrical machine. The converter converts a voltage between a direct current power supply and the inverter. The electrical-machine busbar passes a current between the inverter and the rotating electrical machine. The electrical-machine sensor is a coreless sensor that detects the current flowing through the electrical-machine busbar based on a magnetic field. The electrical-machine-sensor housing accommodates the electrical-machine sensor and the electrical-machine busbar together. The converter busbar passes a current flowing through the converter. The converter sensor is a coreless sensor that detects the current flowing through the converter based on a magnetic field. The converter-sensor housing is disposed apart from the electrical-machine-sensor housing, and accommodates the converter sensor and the converter busbar together.

According to the above structure, a converter-sensor housing for accommodating the converter busbar and the converter sensor is disposed to be apart from the inverter-sensor housing for accommodating the inverter sensor. The heat transfer hardly occurs between the converter-sensor housing and the inverter-sensor housing that are spaced apart to each other, as compared with an integrated housing. Therefore, the heat transfer from the converter busbar to the inverter sensor is suppressed, as compared with a situation in which the busbars and the sensors are held in the integrated housing. Even in a situation where the temperature of the converter busbar rises, the temperature rise of the sensor for the inverter is suppressed.

A power converter 100 according to an embodiment of the present disclosure is described with reference to the drawings. The circuitry structure of the power converter 100 is described with reference to FIG. 1. The power converter 100 is adapted to a vehicle such as a hybrid automobile including an internal combustion engine and a rotating electrical machine as a drive source. The power converter 100 is a device for converting power between a rotating electrical machine 1 and a direct current power supply 2.

Figure 1:
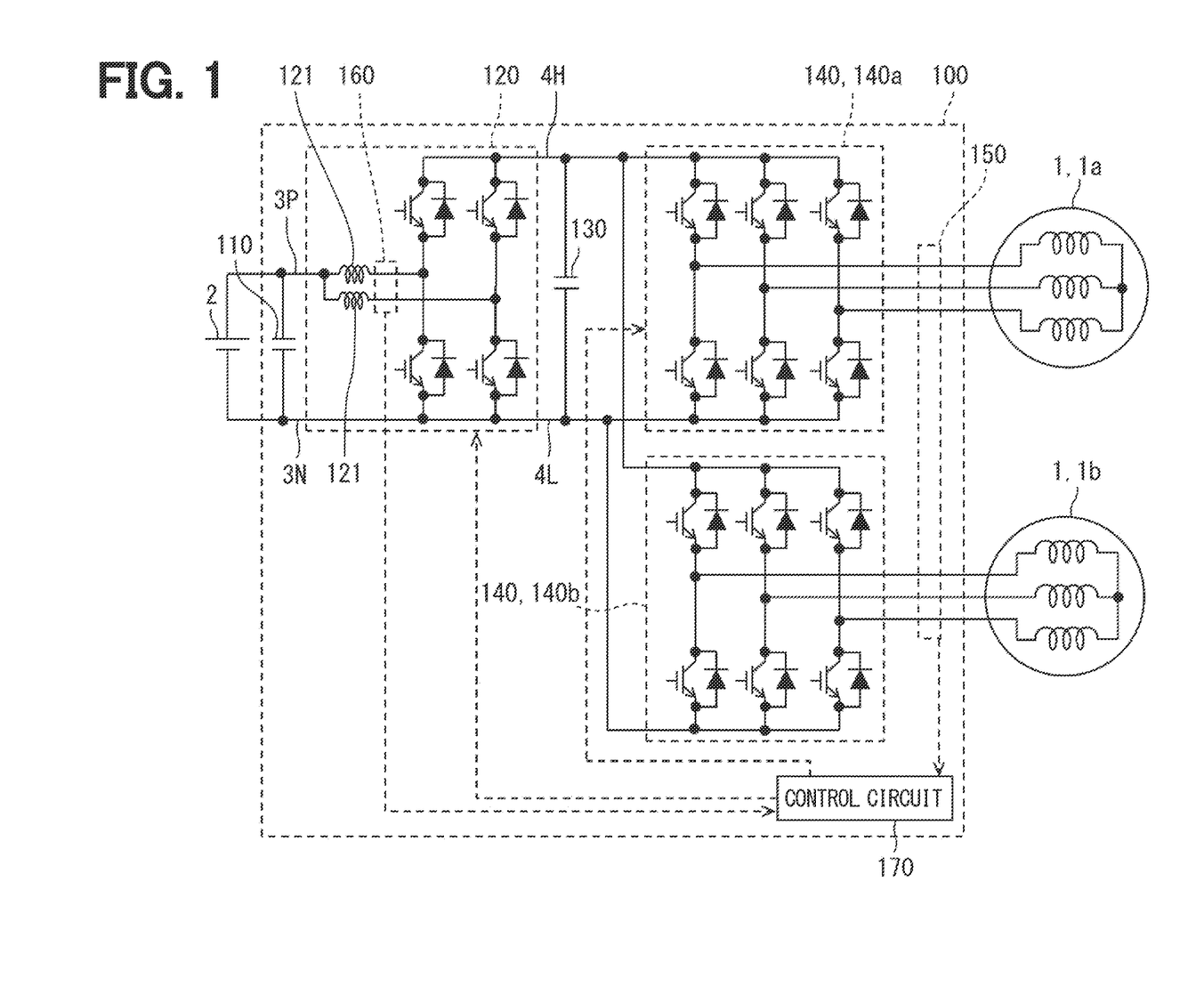
FIG. 1 illustrates a circuitry structure of a power converter.

The rotating electrical machine 1 is a three-phase alternating current rotating electrical machines. The vehicle includes two rotating electrical machines 1, for example, a first rotating electrical machine 1a and a second rotating electrical machine 1b. The first rotating electrical machine 1s is mainly adopted as a traveling drive source for the vehicle. The second rotating electrical machine 1b is mainly adopted as a generator that generates power by using rotational driving force output from the internal combustion engine of the vehicle. The direct current power supply 2 is a power supply unit for outputting a direct current voltage that includes a rechargeable secondary battery such as a lithium ion battery.

As an example of power conversion, the power converter 100 converts the direct current voltage from the direct current power supply 2 into a three-phase alternating current provided to the first rotating electrical machine 1*a*. As a result, the power converter 100 drives the vehicle by the first rotating electrical machine 1*a* with the power charged by the direct current power supply 2. As another example, the power converter 100 converts a three-phase alternating current provided from the second rotating electrical machine 1*b* generated by the rotating drive force in the internal combustion engine into another three-phase alternating current with a different frequency or the like, and outputs the converted three-phase alternating current to the first rotating electrical machine 1*a*.

The application of each of the first rotating electrical machine 1*a* and the second rotating electrical machine 1*b* in the vehicle is not limited to the above description, and may be appropriately modified, added or replaced according to the design of a vehicle. The operation of the power converter 100 is not limited to the above description, and may be appropriately modified, added or replaced. The power converter 100 includes a filter capacitor 110, a converter 120, a smoothing capacitor 130, an inverter 140, a first sensor portion 150, a second sensor portion 160 and a control circuit 170.

The filter capacitor 110 is a capacitor disposed between a positive electrode line 3P and a negative electrode line 3N. The positive electrode line 3P is connected to a positive electrode of the direct current power supply 2, and the negative electrode line 3N is connected to a negative electrode of the direct current power supply 2. The filter capacitor 110 functions as a filter for removing the noise of the direct current voltage supplied to the converter 120 from the direct current power supply 2.

The converter 120 is a converter circuit that converts the direct current voltage to a direct current voltage with a different value. The converter circuit includes, for example, multiple semiconductor switching elements and a reactor. In the present embodiment, a reverse conducting insulated gate bipolar transistor is adopted as the semiconductor switching element. The converter 120 is adopted for the conversion of the direct current voltage between the direct current power supply 2 and the inverter 140. For example, the converter 120 executes an operation to boost the direct current voltage supplied as a voltage between the positive electrode line 3P and the negative electrode line 3N from the direct current power supply 2. The converter 120 has a function to supply the boosted voltage as a voltage between a high potential line 4H and a low potential line 4L to the inverter 140.

The converter 120 has an upper arm and a lower arm arranged to connect the high potential line 4H and the low potential line 4L. Two semiconductor switching elements connected in series are mainly respectively included in the upper arm and the lower arm. The converter 120 includes a reactor 121 arranged to connect a connection node between the semiconductor switching elements and the positive electrode line 3P. That is, the reactor 121 has a first end connected to the connection node between the semiconductor switching elements, and has a second end connected to the positive electrode of the direct current power supply 2 and an end of the filter capacitor 110. The converter 120 in the present embodiment is a so-called two-phase converter that includes two sets of a step-up/step down circuit. Each set includes the above-mentioned upper arm and the lower arm and the reactor 121.

The smoothing capacitor 130 is a capacitor disposed between the high potential line 4H and the low potential line 4L. The smoothing capacitor 130 has a function to smoothen the voltage supplied between the high potential line 4H and the low potential line 4L due to the converter 120.

The inverter 140 is a converter circuit for the conversion between the direct current voltage and the three-phase alternating current. The converter circuit includes, for example, multiple switching elements. The inverter 140 executes the conversion between the direct current voltage and the three-phase alternating current, between the rotating electrical machine 1 and each of the high potential line 4H and the low potential line 4L. The power converter 100 in the present embodiment includes two inverters 140 respectively as the first inverter 140*a* and the second inverter 140*b*. The first inverter 140*a* is connected to the first rotating electrical machine 1*a*. The first inverter 140*a* converts, for example, the direct current voltage between the high potential line 4H and the low potential line 4L to the three-phase alternating current and then supplies the three-phase alternating current to the first rotating electrical machine 1*a*. The second inverter 140*b* is connected to the second rotating electrical machine 1*b*. The second inverter 140*b* rectifies the three-phase alternating current from, for example, the second rotating electrical machine 1*b*, and outputs the rectified three-phase alternating current as the direct current voltage between the high potential line 4H and the low potential line 4L.

The inverter 140 has three upper and lower arms corresponding to three phases on one-to-one basis arranged in parallel to connect the high potential line 4H and the low potential line 4L. The circuitry structure of the upper and lower arms of the inverter 140 in the present embodiment is identical to the circuitry structure of the upper and lower arms of the converter 120. The connection node between the semiconductor switches in the upper and lower arms for each corresponding phase is connected to a phase of the rotating electrical machine 1 corresponding to the inverter 140.

The first sensor portion 150 is adopted for detecting the current flowing between the inverter 140 and the rotating electrical machine 1. The first sensor portion 150 according to the present embodiment individually detects the magnitude and direction of the three-phase current flowing between the first inverter 140*a* and the first rotating electrical machine 1*a*. The first sensor portion 150 according to the present embodiment individually detects the magnitude and direction of the three-phase current flowing between the second inverter 140*b* and the second rotating electrical machine 1*b*.

The second sensor portion 160 is adopted for detecting the current flowing through the converter 120. In particular, the second sensor portion 160 individually and sequentially detects the magnitude and direction of the currents flowing to two reactors 121 included in the converter 120. The second sensor portion 160 according to the present embodiment detects the current flowing through the corresponding reactor 121 and the upper and lower arms. The second sensor portion 160 outputs a detected signal indicating the detected current flowing to the corresponding reactor 121 to the control circuit 170.

The control circuit 170 is a circuit group that controls the operation of the semiconductor switching elements in the converter 120 and the inverter 140. The control circuit 170 mainly includes, for example, a microcomputer including a memory as a non-transitionally recorded storage storing control software and a processor for executing the control software. The control circuit 170 controls the operation of each semiconductor switching element based on, for example, the current detected at the second sensor portion 160 and the first sensor portion 150. The power conversion is executed by the power converter through the control of each semiconductor switching element.

For example, the control circuit 170 sets a target variation pattern of the current flowing through the corresponding phase of the first rotating electrical machine 1a based on the output torque request of the first rotating electrical machine 1a from a host ECU in the vehicle. The control circuit 170 executes the feedback control of the first inverter 140a to vary the output current to the first rotating electrical machine 1a according to the target variation pattern. That is, the control circuit 170 drives each of the semiconductor switching elements in the first inverter 140a based on the output current of the first inverter 140a in the first sensor portion 150.

Figure 2:
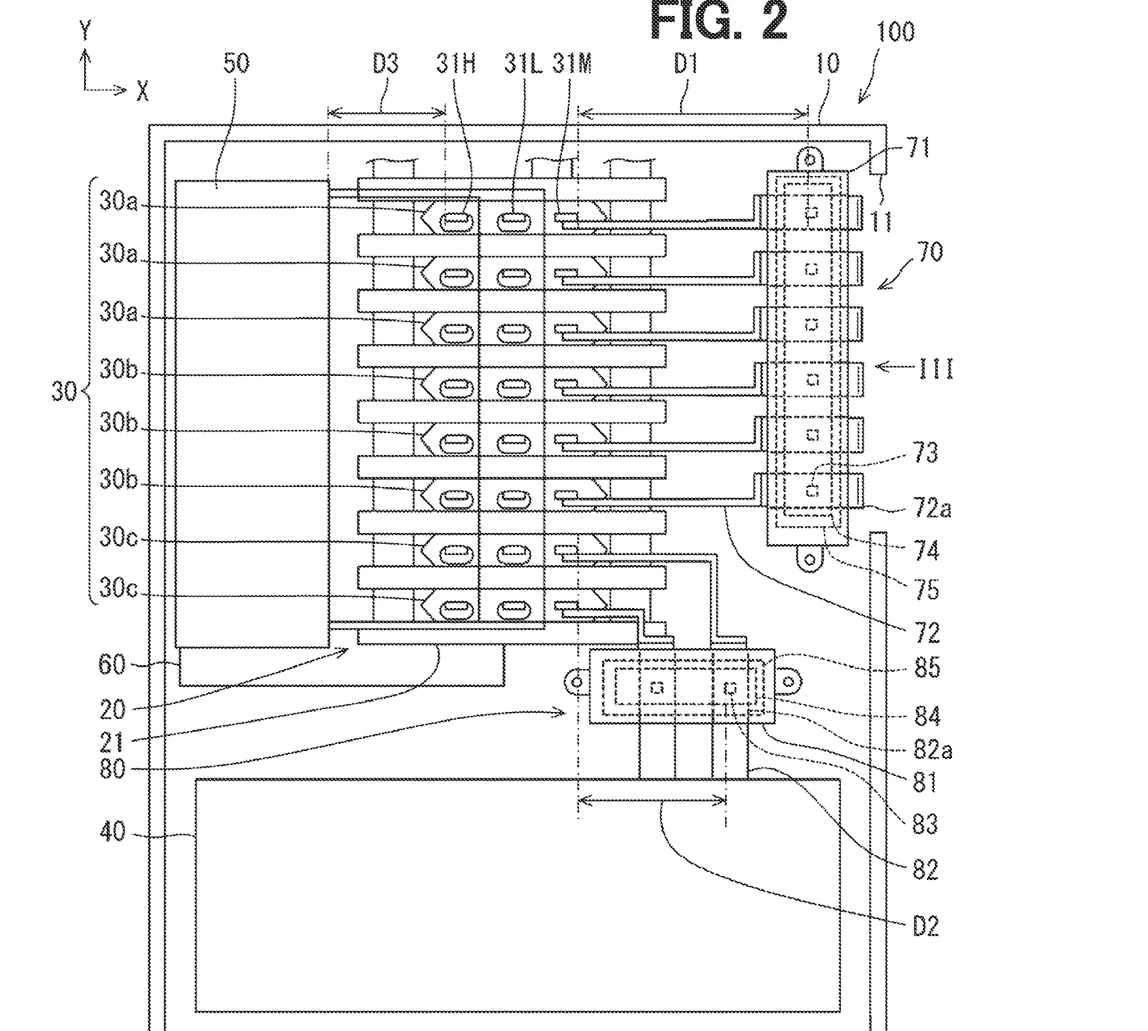
FIG. 2 illustrates a mechanical structure of the power converter.

The following describes the mechanical structure of the power converter 100. Hereinafter, three directions perpendicular to each other are denoted as an X-direction, a Y-direction, and a Z-direction. As illustrated in FIG. 2, the power converter 100 includes a converter housing 10, a semiconductor device 30, a cooler 20, a reactor unit 40, a first capacitor unit 50, a second capacitor unit 60, a first sensor unit 70 and a second sensor unit 80.

The converter housing 10 accommodates members included in the power converter 100. The converter housing 10 is made of, for example, metal material and is formed in a substantially rectangular parallelepiped shape having a storing space inside. The converter housing 10 has an outer wall where an output terminal opening 11 is formed. It can be said that the output terminal opening 11 corresponds to a connector for connecting the rotating electrical machine 1 to the power converter 100. The output terminal opening 11 exposes the first sensor unit 70 to the outside of the converter housing 10.

The cooler 20 is a device that cools down the semiconductor device 30 by, for example, circulating water as a coolant. The water cooled by the radiator and supplied to the power converter 100 flows through the cooler 20. The cooler 20 has multiple coolant flow paths 21 arranged side by side in the Y-direction for branching and flowing the supplied water. Each of the coolant flow paths 21 extends in the X-direction. The semiconductor device 30 is arranged between the coolant flow paths 21.

The semiconductor device 30 is a device in which the semiconductor switching elements and the connection member for electrically connecting these semiconductor switching elements are integrally packaged by, for example, resin sealing. Each of the semiconductor devices 30 in the present embodiment is formed in a substantially rectangular plate shape, and includes semiconductor switching elements corresponding to a group of upper and lower arms, and includes the connection member for the semiconductor switching elements. Each of the semiconductor devices 30 has a substantially rectangular plate shape with its main surface directed in the Y-direction. The semiconductor devices 30 are stacked in the Y-direction with the coolant flow path 21 interposed therebetween.

Each of the semiconductor devices 30 has three main terminals respectively as a high potential terminal 31H, a low potential terminal 31L and a connection node terminal 31M. The high potential terminal 31H corresponds to the connection node connected with the high potential line 4H in a set of the upper and lower arms. The low potential terminal 31L corresponds to the connection node connected with the low potential line 4L in a set of the upper and lower arms. The connection node terminal 31M corresponds to a connection node between the semiconductor switching elements in a set of the upper and lower arms. Three main terminals included in each of the semiconductor devices 30 are respectively aligned in the X-direction, and respectively protrude from the surface facing the semiconductor device 30 in the Z-direction. Among three main terminals aligned in the X-direction, the main terminal located at the end at a side closer to the first sensor unit 70 corresponds to the connection node terminal 31M.

The power converter 100 in the present embodiment includes eight semiconductor devices 30. Specifically, the power converter 100 includes three devices 30a for the first electrical machine, three devices 30b for the second electrical machine, and two devices 30c for the converter, as the semiconductor device 30.

The device 30a for the first electrical machine is the semiconductor device included in the first inverter 140a. That is, the three devices 30a for the first electrical machine correspond to three phases of the first inverter 140a. Each of the three phases includes upper and lower arms. Among the eight semiconductor devices 30 aligned in the Y-direction, three semiconductor devices 30 at an end farther from the reactor unit 40 correspond to the devices 30a for the first electrical machine.

The device 30b for the second electrical machine is the semiconductor device 30 included in the second inverter 140b. That is, the three devices 30b for the second electrical machine correspond to three phases of the second inverter 140b. Each of the three phases includes upper and lower arms. Among the eight semiconductor devices 30 aligned in the Y-direction, three semiconductor devices 30 at the third to fifth rows from a side closer to the reactor unit 40 correspond to the devices 30b for the second electrical machine.

The device 30c for the converter is the semiconductor device 30 included in the converter 120. That is, the two devices 30c for the converter correspond to two phases of the converter 120. Each of the two phases includes upper and lower arms. Among the eight semiconductor devices 30 aligned in the Y-direction, two semiconductor devices 30 located at a side closer to the reactor unit 40 correspond to the device 30c for the converter.

The reactor unit 40 is a device in which the reactor 121 is integrally packaged together with attached members such as a core made of magnetic material and connection members. Inside the reactor unit 40 according to the present embodiment, two reactors 121 adopted in the two-phase converter 120 are sealed by resin to be insulated from each other. A first end of each of the reactors 121 is drawn out from the reactor unit 40 and connected to the second capacitor unit 60. A second end of each of the reactors 121 is drawn out from the reactor unit 40 and connected to the second sensor unit 80. The reactor unit 40 in the present embodiment and the semiconductor device 30 accommodated in the cooler 20 are aligned in the Y-direction.

The first capacitor unit 50 is a device in which a capacitor corresponding to the smoothing capacitor 130 is integrally packaged together with attached members such as connection members. The first capacitor unit 50 connects both ends of the built-in smoothing capacitor 130 to the high potential terminal 31H and the low potential terminal 31L of each of the semiconductor devices 30. The first capacitor unit 50 according to the present embodiment and the semiconductor device 30 accommodated in the cooler 20 are aligned in the X-direction.

The second capacitor unit 60 is a device in which a capacitor corresponding to the filter capacitor 110 is integrally packaged together with attached members such as connection members. The second capacitor unit 60 connects a first end of the built-in filter capacitor 110 to the first end of each of the reactor 121 embedded in the reactor unit 40. The second capacitor unit 60 in the present embodiment and the reactor unit 40 are aligned in the Y-direction. The second capacitor unit 60 is arranged to partially overlap the cooler 20 in the projection view in the Z-direction.

Figure 3:
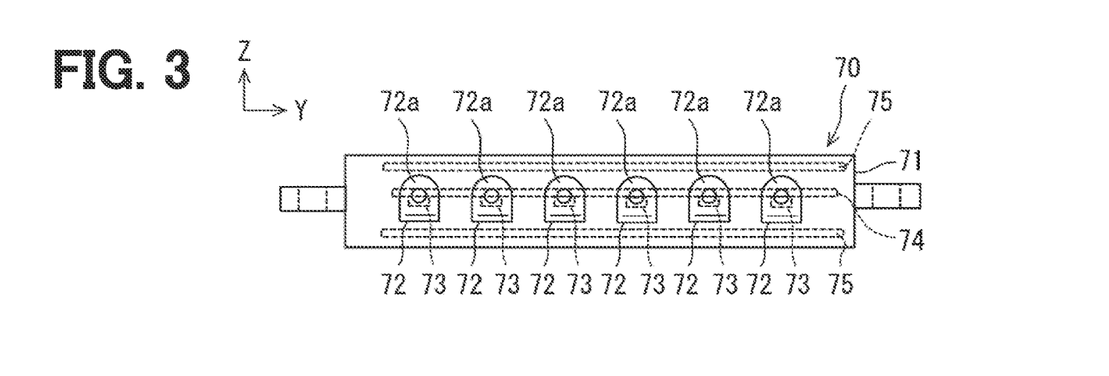
FIG. 3 illustrates a first sensor unit as viewed in III-direction of FIG. 2.

The first sensor unit 70 is a device in which members for realizing the function of the first sensor portion 150 are integrally packaged. The first sensor unit 70 and the semiconductor device 30 accommodated in the cooler 20 are aligned in the X-direction. In particular, the first sensor unit 70 is located at a side opposite from the first capacitor unit 50 with the cooler 20 is between the first sensor unit 70 and the first capacitor unit 50 in the X-direction. As illustrated in FIGS. 2, 3, the first sensor unit 70 includes an electrical-machine-sensor housing 71, an electrical-machine busbar 72, an electrical-machine sensor 73, an electrical-machine-sensor substrate 74 and an electrical-machine-sensor shield 75.

The electrical-machine-sensor housing 71 supports the members included in the first sensor unit 70. The electrical-machine-sensor housing 71 is formed by insulating material such as resin. The electrical-machine-sensor housing 71 has a rectangular parallelepiped shape with the lengthwise direction being the Y-direction. The electrical-machine busbar 72 and the electrical-machine-sensor shield 75 are embedded in the electrical-machine-sensor housing 71 by insert molding.

The electrical-machine-sensor substrate 74 on which the electrical-machine sensor 73 mounts is accommodated in the storage space formed inside the electrical-machine-sensor housing 71. The electrical-machine-sensor housing 71 integrally accommodates the electrical-machine sensors 73 to maintain their positions relative to the electrical-machine busbar 72. Fastening portions for fixing the first sensor unit 70 are provided at both ends of the electrical-machine-sensor housing 71 in the Y-direction.

The electrical-machine busbar 72 is a conductive member for passing a current flowing between the inverter 140 and the rotating electrical machine 1, as a detected target current of the first sensor unit 70. The electrical-machine busbar 72 is formed in a partially bent strip shape from conductive material such as copper. The first sensor unit 70 according to the present embodiment has six electrical-machine busbars 72 corresponding to the devices 30*a* for the first electrical machine and the devices 30*b* for the second electrical machine on one-to-one basis. Each of the devices 30*a* and 30*b* may also be referred to as an electrical-machine device.

An end of each of the electrical-machine busbars 72 is connected to the connection node terminal 31M of the corresponding device 30*a* for the first electrical machine or the corresponding device 30*b* for the second electrical machine by, for example, welding. Each of the electrical-machine busbars 72 extends in the X-direction as a whole, and penetrates the electrical-machine-sensor housing 71. Therefore, the X-direction corresponds to the extending direction of the electrical-machine busbar 72. A portion of each of the electrical-machine busbars 72 located inside the electrical-machine-sensor housing 71 has a strip-like shape extending in the X-direction with the main surface facing the Z-direction.

A connector-terminal portion 72*a* is formed at a portion of each of the electrical-machine busbars 72 that is exposed from a side closer to the electrical-machine-sensor housing 71 opposite to the semiconductor device 30. Each of the connector-terminal portions 72*a* has a plate-like shape with a main surface directed in the X-direction, and is formed with a through hole for fastening a connection cable with the rotating electrical machine 1. That is, the first sensor unit 70 functions as an output terminal block to the rotating electrical machine 1.

The electrical-machine sensor 73 is a device that detects the current flowing through the electrical-machine busbar 72. The electrical-machine sensor 73 detects the flowing current by detecting the strength of the magnetic field generated by the flowing current. The electrical-machine sensor 73 is a sensor package that includes a semiconductor substrate at which a magnetoelectric traducer such as a Magneto Resistive Effect Device. The electrical-machine sensor 73 outputs, as an electrical signal, a detected value indicating, for example, the strength and orientation of the magnetic field along a predetermined detection axis at its own position.

The first sensor unit 70 according to the present embodiment has six electrical-machine sensors 73 corresponding to six electrical-machine busbars 72 on one-to-one basis. Each of the electrical-machine sensors 73 faces the corresponding electrical-machine busbar 72 in the Z-direction, with the detection axis in the Y-axis. That is, the electrical-machine sensor 73 detects the magnetic field in the Y-direction generated by the current in the X-direction at a position facing the electrical-machine busbar 72 in the Z-direction. Six electrical-machine sensors 73 are aligned in the Y-direction at a pitch that matches the pitch of the electrical-machine busbars 72 in the Y-direction. A member made of magnetic material is not provided at the middle of the electrical-machine sensor 73 in the Y-direction. That is, the electrical-machine sensor 73 is a coreless current sensor without magnetic core surrounding the electrical-machine busbar 72.

The electrical-machine-sensor substrate 74 is a circuit board on which a wiring made of, for example, copper is provided at a flat base material made of, for example, epoxy resin. The electrical-machine-sensor substrate 74 is formed in a rectangular plate shape with the main surface facing the Z-direction and the lengthwise direction being the Y-direction. In addition to six electrical-machine sensors 73, for example, a connector for making an electrical connection with the control circuit 170 mounts on the electrical-machine-sensor substrate 74. The electrical-machine-sensor substrate 74 on which the electrical-machine sensors 73 mount is accommodated inside the electrical-machine-sensor housing 71.

The electrical-machine-sensor shield 75 is a magnetic shield member made of magnetic material and formed in a rectangular plate shape. The electrical-machine-sensor shield 75 is formed with its main surface facing the Z-direction and its lengthwise direction being the Y-direction. The first sensor unit 70 includes two electrical-machine sensor shields 75 to sandwich the electrical-machine sensor 73 and the electrical-machine busbar 72 in the Z-direction. Each of the electrical-machine sensor shields 75 extends in the Y-direction to straddle six converter sensors 83 aligned in the Y-direction and covers the electrical-machine sensors 73. Each of the electrical-machine sensor shields 75 suppresses the influence caused by the external magnetic field of the first sensor unit 70 on the detected value of the electrical-machine sensor 73. Each of the electrical-machine sensor shields 75 is embedded inside the electrical-machine-sensor housing 71.

The second sensor unit 80 is a device in which members for realizing the function of the second sensor portion 160 are integrally packaged. The second sensor unit 80 in the present embodiment is located between the semiconductor device 30 and the reactor unit 40 in the Y-direction. As illustrated in FIG. 2, the second sensor unit 80 includes a converter-sensor housing 81, a converter busbar 82, a converter sensor 83, a converter-sensor substrate 84 and a converter-sensor shield 85.

The converter-sensor housing 81 supports members included in the second sensor unit 80, and is formed by the insulation material identical to the electrical-machine-sensor housing 71. The converter-sensor housing 81 in the present embodiment has a rectangular parallelepiped shape with the lengthwise direction being the X-direction. The converter busbar 82 and the converter-sensor shield 85 are embedded in the converter-sensor housing 81 by insert molding. The converter-sensor housing 81 is located apart from the electrical-machine-sensor housing 71. That is, the converter-sensor housing 81 and the electrical-machine-sensor housing 71 are not in contact with each other.

The converter-sensor substrate 84 on which the converter sensor 83 mounts is accommodated in the storage space formed inside the converter sensor housing 81. The converter-sensor housing 81 integrally accommodates the converter sensors 83 to maintain their positions relative to the converter busbar 82. Fastening portions for fixing the second sensor unit 80 are provided at both ends of the converter-sensor housing 81 in the X-direction.

The converter busbar 82 is a conductive member for passing a current flowing through the converter 120, as a detected target current of the second sensor unit 80. More specifically, the converter busbar 82 is a conductive member for passing a current flowing through the reactor 121 included in the converter 120. The converter busbar 82 is formed in a partially bent strip shape from conductive material such as copper that is identical to the electrical-machine busbar 72. The second sensor unit 80 includes two converter busbars 82 corresponding to two reactors 121.

Each of the converter busbars 82 in the present embodiment connects a first end of the corresponding reactor 121 to the connection node terminal 31M of the device 30*c* for the converter that corresponds to the reactor 121. Each of the converter busbars 82 in the present embodiment is connected to the connection node terminal 31M in an arrangement that is drawn out in the X-direction from the connection node terminal 31M. Each of the converter busbars 82 is bent at a position closer to the semiconductor device 30 than the electrical-machine sensor 73 in the X-direction, and extends towards the reactor unit 40 in the Y-direction. The device 30*c* may also be referred to as a converter device.

A portion of a section of the converter busbar 82 extending in the Y-direction is accommodated inside the converter-sensor housing 81. At least a section of the converter busbar 82 inside the converter-sensor housing 81 is a detected portion 82*a* to receive the detection of the converter sensor 83. The extending direction of the detected portion 82*a* is a direction intersecting the X-direction. More specifically, the detected portion 82*a* extends in the Y-direction perpendicular to the X-direction. The detected portion 82*a* is formed as a section having a shape extending in the Y-direction in a belt shape with the main surface facing the Z-direction. A portion of the converter busbar 82 exposed from the converter-sensor housing 81 is not in contact with the electrical-machine-sensor housing 71 and is spaced apart from the electrical-machine-sensor housing 71.

The converter sensor 83 is a device that detects the current flowing through the converter busbar 82. The converter sensor 83 detects the flowing current by detecting the strength of the magnetic field generated by the flowing current. In the present embodiment, a sensor package having the structure identical to the electrical-machine sensor 73 is adopted as the converter sensor 83. As similar to the electrical-machine sensor 73, the converter sensor 83 outputs, as an electrical signal, a detected value indicating, for example, the strength and orientation of the magnetic field along a predetermined detection axis at its own position.

The second sensor unit 80 according to the present embodiment has two converter sensors 83 corresponding to two converter busbar 82 on one-to-one basis. Each of the converter sensors 83 faces the detected portion 82*a* of the corresponding converter busbar 82, with the detection axis in the X-direction. That is, the converter sensor 83 detects the magnetic field in the X-direction generated by the current in the Y-direction at a position facing the detected portion 82*a* in the Z-direction.

The detection axis of the converter sensor 83 is in a direction along the extending direction of the electrical-machine busbar 72. Each of the converter sensors 83 and each of the electrical-machine sensors 73 are located substantially at the identical plane defined by the X-direction and the Y-direction. Two converter sensors 83 are aligned in the Y-direction at a pitch that matches the pitch of the detected portion 82*a* in the Y-direction. A member made of magnetic material is not provided at the middle of the converter sensor 83 in the Y-direction. That is, the converter sensor 83 is a coreless current sensor without magnetic core surrounding the converter busbar 82. Therefore, the current sensors included in the power converter 100 are coreless current sensors.

In the X-direction, the distance between the converter sensor 83 and the device 30*c* for the converter is shorter than the distance between the device 30*a* for the first electrical machine or the device 30*b* for the second electrical machine. In particular, a converter-sensor distance D2 is shorter than an electrical-machine-sensor distance D1. The electrical-machine-sensor distance D1 is a distance in the X-direction between the electrical-machine sensor 73 and the connection node terminal 31M of the device 30*a* for the first electrical machine or the device 30*b* for the second electrical machine. The converter-sensor distance D2 is a distance in the X-direction between the converter sensor 83 and the connection node terminal 31M of the device 30*c* for the converter. The electrical-machine-sensor distance D1 is longer than the capacitor distance D3. The capacitor distance D3 is a distance in the X-direction between the first capacitor unit 50 and the high potential terminal 31H of the device 30*a* for the first electrical machine or the device 30*b* for the second electrical machine. That is, the electrical-machine sensor 73 is arranged farther from the semiconductor device 30 than the smoothing capacitor 130 and the converter sensor 83 in the X-direction.

The converter-sensor substrate 84 is a circuit board that is identical to the electrical-machine-sensor substrate 74. The converter-sensor substrate 84 is formed in a rectangular plate shape with the main surface facing the Z-direction and the lengthwise direction being the Y-direction. In addition to two converter sensors 83, for example, a connector for making an electrical connection with the control circuit 170 mounts on the converter-sensor substrate 84. The converter-sensor substrate 84 on which the converter sensor 83 mounts is accommodated in the storage space formed inside the converter sensor housing 81. Therefore, the converter-sensor substrate 84 is provided at the second sensor unit 80 as a circuit board different from the electrical-machine-sensor substrate 74.

The converter-sensor shield 85 is a magnetic shield member made of magnetic material that is identical to the electrical-machine-sensor shield 75, and is formed in a rectangular plate shape. The converter-sensor shield 85 is formed with its main surface facing the Z-direction and its lengthwise direction being the Z-direction. The second sensor unit 80 includes two converter-sensor shields 85 to sandwich the converter sensor 83 and the converter busbar 82 in the Z-direction. Each of the converter-sensor shield 85 extends in the X-direction to straddle two converter sensors 83 aligned in the X-direction to cover the converter sensors 83 in the projection view in the Z-direction.

Each of the converter-sensor shields 85 suppresses the influence caused by the external magnetic field of the second sensor unit 80 on the detected value of the converter sensor 83. Each of the converter sensor shields 85 is embedded inside the converter-sensor housing 81. Therefore, the converter-sensor shield 85 is provided at the second sensor unit 80 as a magnetic shield member different from the electrical-machine-sensor shield 75.

Summary of Embodiment

According to the above embodiment, the converter-sensor housing 81 for storing the converter busbar 82 and the converter sensor 83 is apart from the electrical-machine-sensor housing 71 for storing the electrical-machine sensor 73. The heat transfer hardly occurs between the converter-sensor housing 81 and the electrical-machine-sensor housing 71 that are spaced apart to each other, as compared with an integrated housing. Therefore, the heat transfer from the converter busbar 82 to the electrical-machine sensor 73 is suppressed, as compared with a situation in which the busbars and the sensors are held in the integrated housing. Even in a situation where the temperature of the converter busbar 82 rises, the temperature rise of the electrical-machine sensor 73 is suppressed.

In addition to the effects described above, crosstalk between the first sensor portion 150 and the second sensor portion 160 is reduced by the structure in which the electrical-machine-sensor housing 71 and the converter-sensor housing 81 are separated from each other. That is, a component of the current of converter busbar 82 may be superimposed on the detected value of the electrical-machine sensor 73. A component of the current of electrical-machine busbar 72 may be superimposed on the detected value of converter sensor 83. The superimposition of such a component is reduced by the separation between the electrical-machine-sensor housing 71 and the converter-sensor housing 81, as compared with a structure in which the electrical-machine-sensor housing 71 and the converter-sensor housing 81 are in contact with each other.

The separate electrical-machine-sensor housing 71 and the converter-sensor housing 81 are fixed by fastening portions formed at both ends in the lengthwise direction. With such a structure, the distance between the positions where the housing is supported is shortened as compared with the situation where both ends of the integrated housing are fixed. In addition to the above described effects, the effect of enhancing the vibration resistance of the sensor housing for storing each sensor can be attained.

In the present embodiment, the detected portion 82a of the converter busbar 82 extends in a direction intersecting the extending direction of the electrical-machine busbar 72, in particular, in a direction perpendicular to the extending direction of the electrical-machine busbar 72. As a result, with regard to the components of the magnetic field generated by the electrical-machine busbar 72 superimposed on the magnetic field generated by the detected, a component in the direction of the magnetic field generated by the detected portion 82a is reduced. Therefore, in the detected value of the converter sensor 83 for detecting the magnetic field generated by the detected portion 82a, the superimposition of the noise generated by the current flowing through the electrical-machine busbar 72 is suppressed. The direction perpendicular to the extending direction of the electrical-machine busbar 72 may also be simply referred to as a perpendicular direction.

In the present embodiment, the distance between the electrical-machine sensor 73 and the device 30a for the first electrical machine or the device 30b for the second electrical machine is shorter than the distance between the device 30c for the converter and the converter sensor 83. When the distance between the electrical-machine sensor 73 and the device for the inverter becomes larger in the extending direction of the electrical-machine busbar 72, the electrical-machine sensor 73 is less susceptible to the switching noise caused by the semiconductor switching element in the device 30a for the first electrical machine and the semiconductor switching element in the device 30b for the second electrical machine. On the other hand, in a situation where the distance between the converter sensor 83 and the device 30a for the first electrical machine is increased, the length of the converter busbar 82 may be excessively increased. That is, the length of the converter busbar may be increased by detouring the converter busbar from the device for the converter in a direction different from the reactor.

According to the structure in the present embodiment, even though the distance between the electrical-machine sensor 73 and the device 30a for the first electrical machine and the device 30b for the second electrical machine is increased, it is possible to inhibit an increase in the length caused by detouring the converter busbar 82. Therefore, the power converter can reduce switching loss in the detected value of the electrical-machine sensor 73 while inhibiting an increase in the length of the converter busbar 82.

In the present embodiment, the electrical-machine busbar 72 has the connector-terminal portion 72a for connecting the rotating electrical machine 1 to the power converter 100. That is, the first sensor unit 70 functions as an output terminal block of the power converter 100. The power converter 100 can be connected to the rotating electrical machine 1 without providing an additional output terminal block. Therefore, the physical size of the power converter is further reduced in addition to the reduction by adopting a coreless current sensor.

Other Embodiments

Although the embodiments of the present disclosure have been described above, the present disclosure is not limited to the above-described embodiments, and the following modified examples are also included in the technical scope of the present disclosure, and furthermore, various changes can be made within the range that does not deviate from the scope. In the following description, elements having the same reference numerals as those used so far are the same as elements having the same reference numerals in the previous embodiments, except when specifically mentioned. When only a part of the configuration is described, the embodiment described above can be applied to other parts of the configuration.

Figure 4:
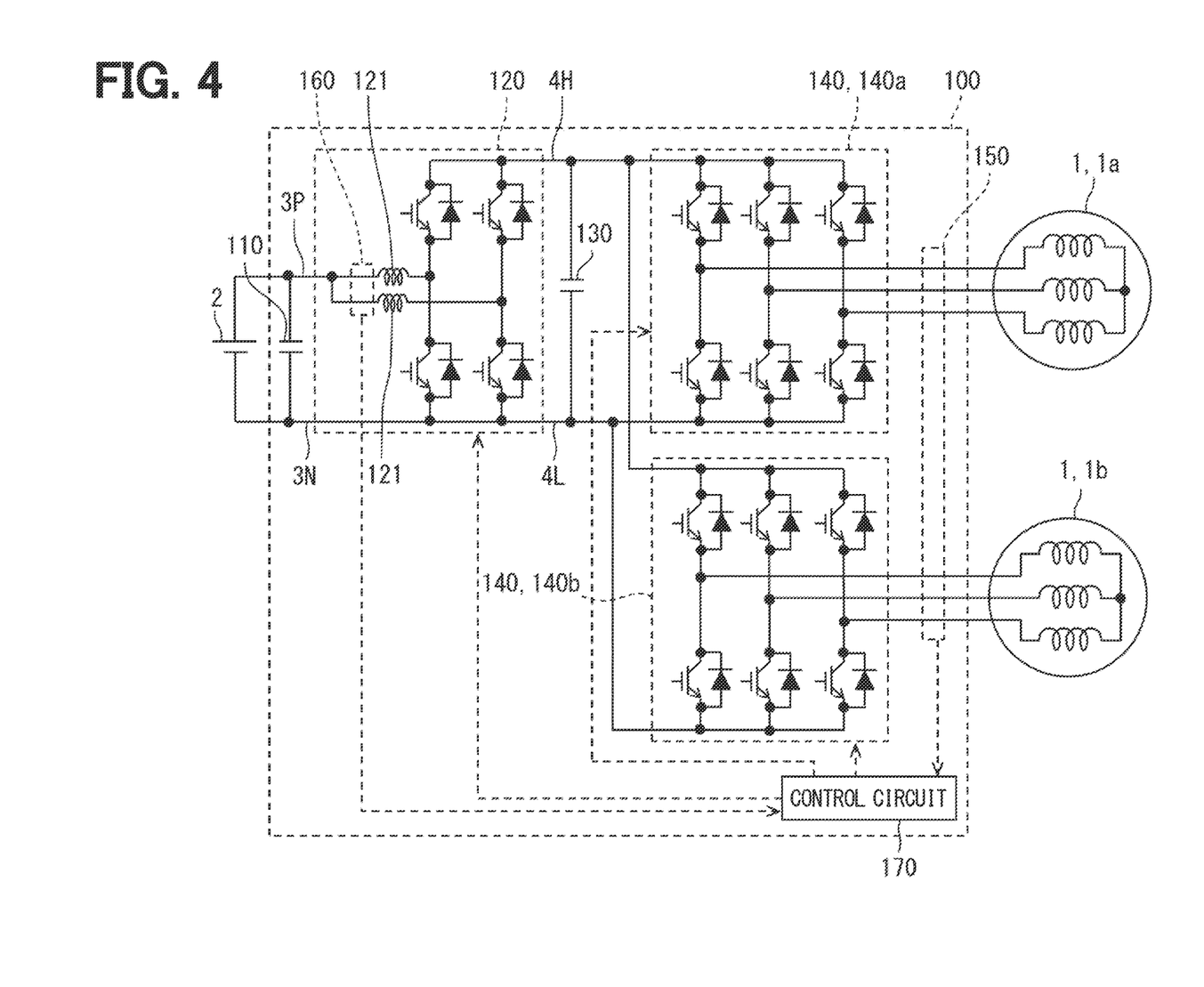
FIG. 4 illustrates a circuitry structure of a power converter in a modified example.
Figure 5:
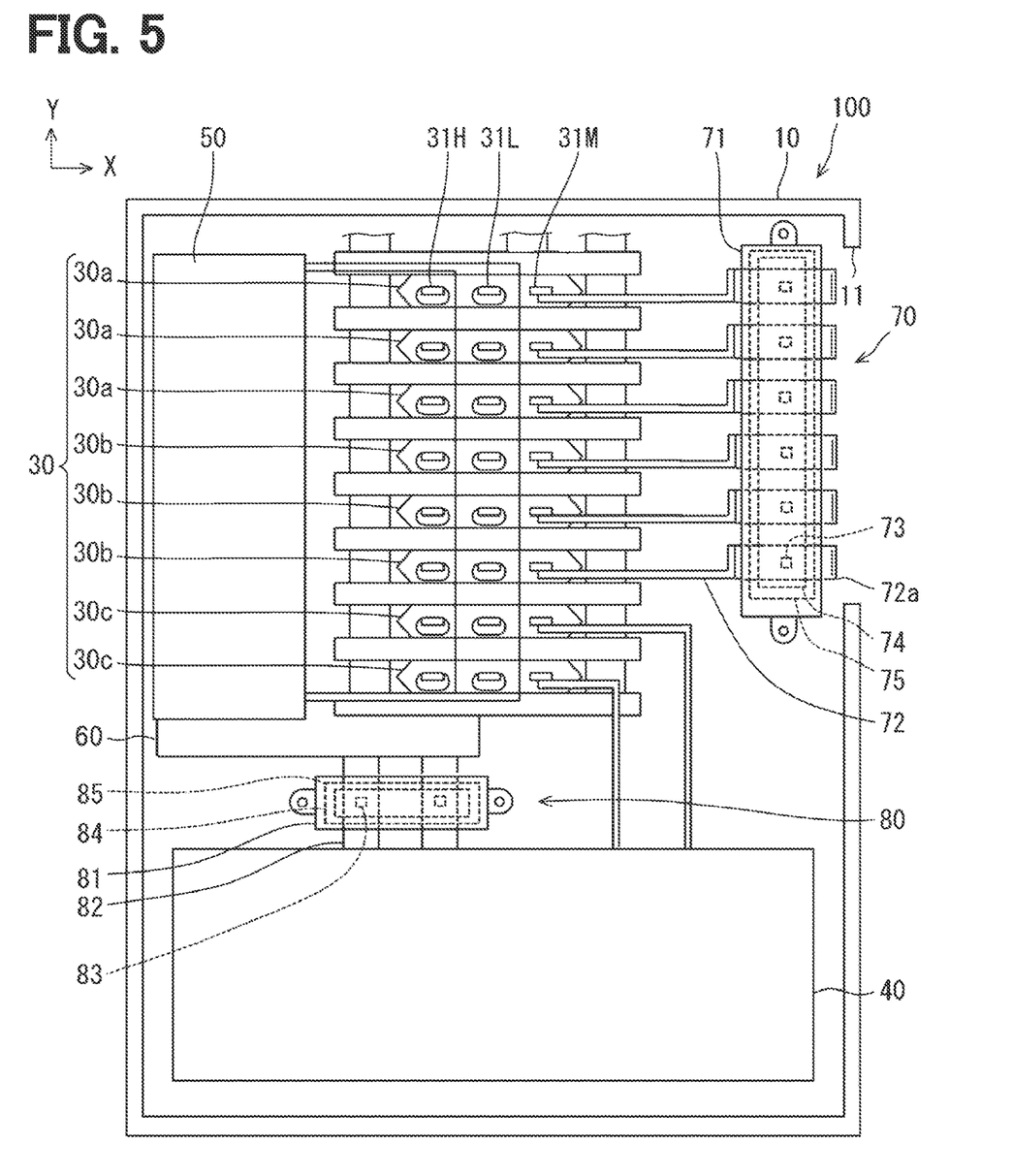
FIG. 5 illustrates a mechanical structure of a power converter in a modified example.

In the power converter 100 according to a modified example, as illustrated in FIG. 4, the detected position of the current through the second sensor portion 160 is a position between the converter 120 and the filter capacitor 110. In other words, the detected position is a position at a side closer to the filter capacitor 110 opposite to the reactor 121. As illustrated in FIG. 5, the converter busbar 82 is arranged to connect the reactor 121 included in the converter 120 and the filter capacitor 110. In other words, the detected position of the second sensor portion 160 moves away from the semiconductor switching element and approaches the filter capacitor 110. Therefore, with such an arrangement, the switching noise, which is caused by the semiconductor switching element, in the current flowing through the converter busbar 82 is suppressed.

In the above embodiment, the power converter 100 includes two rotating electrical machines 1 and two inverters 140 respectively connected to two rotating electrical machines 1. However, the number of rotating electrical machine(s) 1 connected to the power converter 100 and the number of inverter(s) 140 respectively connected to the rotating electrical machine(s) 1 may be one or three or more. Therefore, the number of the electrical-machine busbar(s) 72 and the electrical-machine sensor(s) 73 included in the first sensor unit 70 may be changed accordingly. The converter 120 may adopt a structure having a single-phase converter or a structure having multiple-phase converter with three or more phases. Therefore, the number of the converter busbar(s) 82 and the converter sensor(s) 83 included in the second sensor unit 80 may be changed accordingly.

In the above embodiment, the converter sensor 83 detects the magnetic field generated by the detected portion 82a of the converter busbar 82 extending in a direction perpendicular to the extending direction of the electrical-machine busbar 72. However, the converter sensor 83 may detect the magnetic field of a portion of the converter busbar 82 extending parallel to the electrical-machine busbar 72.

In the above-mentioned embodiment, the converter sensor 83 is arranged at a position closer to the semiconductor device 30 than the electrical-machine sensor 73 in the X-direction. However, the distance from the semiconductor device 30 in the X-direction may be substantially identical to the distance between the converter sensor 83 and the electrical-machine sensor 73, or the converter sensor 83 may be farther.

In the above-mentioned embodiment, the first sensor unit 70 functions as the output terminal block of the power converter 100. However, the output terminal block may be provided separately from the first sensor unit 70.

In the above-mentioned embodiment, the converter 120 has a circuitry structure having upper and lower arms mainly with the semiconductor switching elements and the reactor 121. However, the circuitry structure of the converter 120 may not be restricted to the above description, and may be modified accordingly. Along with the modification of the circuitry structure of the converter 120, the combination of the members connected through the converter busbar 82 may be modified accordingly. That is, the arrangement of the converter busbar 82 is not restricted to the above embodiment, as long as the current can flow through any portion of the converter 120. In other words, the member included in the converter 120 causing a rise in the temperature of the converter busbar 82 is not limited to the reactor 121.

What is claimed is:

1. A power converter comprising:
   an inverter configured to supply a three-phase alternating current to a rotating electrical machine;
   a converter configured to convert a voltage between a direct current power supply and the inverter;
   an electrical-machine busbar configured to pass a current between the inverter and the rotating electrical machine;
   an electrical-machine sensor being a coreless sensor configured to detect the current flowing through the electrical-machine busbar based on a magnetic field;
   an electrical-machine-sensor housing configured to accommodate the electrical-machine sensor and the electrical-machine busbar together;
   a converter busbar configured to pass a current flowing through the converter;
   a converter sensor being a coreless sensor configured to detect the current flowing through the converter based on a magnetic field; and
   a converter-sensor housing disposed apart from the electrical-machine-sensor housing, the converter-sensor housing configured to accommodate the converter sensor and the converter busbar together,
   wherein the converter busbar has a section extending in a perpendicular direction perpendicular to an extending direction of the electrical-machine busbar, and is disposed at a position apart from the electrical-machine busbar in the perpendicular direction.

2. The power converter according to claim 1,
   wherein the electrical-machine busbar includes a plurality of electrical-machine busbars aligned in the perpendicular direction, and
   wherein the converter busbar is disposed at a position apart from the plurality of electrical-machine busbars in the perpendicular direction.

3. The power converter according to claim 1,
   wherein the electrical-machine sensor includes a plurality of electrical-machine sensors aligned in the perpendicular direction, and
   wherein the converter sensor is disposed at a position apart from the plurality of electrical-machine sensors.

4. The power converter according to claim 1, further comprising:
   an electrical-machine-sensor shield made of magnetic material and accommodated at the electrical-machine-sensor housing together with the electrical-machine sensor and the electrical-machine busbar; and
   a converter-sensor shield made of magnetic material and accommodated at the converter-sensor housing together with the converter sensor and the converter busbar.

5. The power converter according to claim 1,
   wherein the converter busbar has a detected portion extending in a direction intersecting the extending direction of the electrical-machine busbar, and
   wherein the converter sensor detects the current flowing through the converter busbar based on a magnetic field generated by the detected portion.

6. The power converter according to claim 5,
   wherein the detected portion extends in a direction perpendicular to the extending direction.

7. The power converter according to claim 1,
   wherein the inverter includes an electrical-machine device adapted to the rotating electrical machine and connected to the electrical-machine busbar,
   wherein the converter includes a converter device adapted to the converter and connected to the converter busbar,
   wherein the converter device and the electrical-machine device are aligned in a direction perpendicular to the extending direction of the electrical-machine busbar, wherein an electrical-machine-sensor distance is defined as a distance between the electrical-machine sensor and the electrical-machine device in the extending direction of the electrical-machine busbar, and a converter-sensor distance is defined as a distance between the converter sensor and the converter device in the extending direction, and wherein the electrical-machine-sensor distance is larger than the converter-sensor distance.

8. The power converter according to claim 1, further comprising:

a filter capacitor configured to be connected between a positive electrode line and a negative electrode line, the positive electrode line connected to a positive electrode of the direct current power supply, the negative electrode line connected to a negative electrode of the direct current power supply, wherein the converter busbar connects the converter and the filter capacitor.

9. The power converter according to claim 1, wherein the electrical-machine busbar includes a connector-terminal portion configured to connect the rotating electrical machine to the power converter.

* * * * *